United States Patent
Lee

(10) Patent No.: US 11,005,085 B2
(45) Date of Patent: May 11, 2021

(54) METHOD FOR PRODUCING ELECTRODE TAB HAVING THICKNESS DIFFERENCE, AND RECHARGEABLE BATTERY COMPRISING SAME

(71) Applicant: Samsung SDI Co., Ltd., Yongin-si (KR)

(72) Inventor: Jaewook Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/330,740

(22) PCT Filed: Sep. 4, 2017

(86) PCT No.: PCT/KR2017/009639
§ 371 (c)(1),
(2) Date: Mar. 5, 2019

(87) PCT Pub. No.: WO2018/048148
PCT Pub. Date: Mar. 15, 2018

(65) Prior Publication Data
US 2019/0207197 A1    Jul. 4, 2019

(30) Foreign Application Priority Data

Sep. 6, 2016  (KR) .................. 10-2016-0114633

(51) Int. Cl.
*H01M 2/26* (2006.01)
*H01M 2/30* (2006.01)
(Continued)

(52) U.S. Cl.
CPC ............. *H01M 2/263* (2013.01); *H01M 2/06* (2013.01); *H01M 2/08* (2013.01); *H01M 2/266* (2013.01);
(Continued)

(58) Field of Classification Search
CPC .......... H01M 2/263; H01M 2/06; H01M 2/08; H01M 2/266; H01M 10/0587; H01M 10/42; H01M 2/30
See application file for complete search history.

(56) References Cited

U.S. PATENT DOCUMENTS

2004/0038122 A1   2/2004  Hisamitsu et al.
2006/0115729 A1   6/2006  Lee
(Continued)

FOREIGN PATENT DOCUMENTS

CN    202352750 U    7/2012
JP    11-167913 A    6/1999
(Continued)

OTHER PUBLICATIONS

Chinese Office Action dated Mar. 24, 2021, issued in corresponding Chinese Patent Application No. 201780054750.9 (10 pages).

*Primary Examiner* — Cynthia K Walls
(74) *Attorney, Agent, or Firm* — Lewis Roca Rothgerber Christie LLP

(57) ABSTRACT

A method for producing an electrode tab according to an embodiment of the present invention may comprise: a step of preparing a thin plate of a strip shape having a first thickness; a step of forming an adhesion part by compressing the thin plate from one end thereof to a second thickness; and a step of forming, from the other end of the thin plate to the adhesion part, a lead tab part formed to have the first thickness, by releasing the compression applied to the adhesion part.

10 Claims, 9 Drawing Sheets

(51) Int. Cl.
*H01M 2/06* (2006.01)
*H01M 2/08* (2006.01)
*H01M 10/0587* (2010.01)
*H01M 10/42* (2006.01)

(52) U.S. Cl.
CPC ......... *H01M 2/30* (2013.01); *H01M 10/0587* (2013.01); *H01M 10/42* (2013.01)

(56) References Cited

U.S. PATENT DOCUMENTS

| | | | |
|---|---|---|---|
| 2008/0070115 A1* | 3/2008 | Saruwatari | H01M 4/661 429/211 |
| 2010/0028770 A1* | 2/2010 | Ryu | H01M 4/661 429/163 |
| 2012/0308886 A1 | 12/2012 | Goto et al. | |
| 2014/0272487 A1* | 9/2014 | Ishii | H01M 10/0431 429/53 |
| 2015/0017519 A1 | 1/2015 | Cho | |
| 2015/0287966 A1 | 10/2015 | Jeong | |
| 2016/0149221 A1 | 5/2016 | Choi | |

FOREIGN PATENT DOCUMENTS

| | | |
|---|---|---|
| JP | 2003-288882 A | 10/2003 |
| JP | 2004-87260 A | 3/2004 |
| JP | 2006-228591 A | 8/2006 |
| JP | 2011-138633 A | 7/2011 |
| KR | 10-0614391 B1 | 8/2006 |
| KR | 10-2014-0012065 A | 1/2014 |
| KR | 10-2015-0007741 A | 1/2015 |
| KR | 10-2015-0041351 A | 4/2015 |
| KR | 10-2015-0115358 A | 10/2015 |
| KR | 10-2016-0062625 A | 6/2016 |
| KR | 10-2017-0024383 A | 3/2017 |

* cited by examiner

METHOD FOR PRODUCING ELECTRODE TAB HAVING THICKNESS DIFFERENCE, AND RECHARGEABLE BATTERY COMPRISING SAME

CROSS-REFERENCE TO RELATED APPLICATION(S)

This application is a National Phase Patent Application of International Patent Application Number PCT/KR2017/009639, filed on Sep. 4, 2017, which claims priority of Korean Patent Application No. 10-2016-0114633, filed Sep. 6, 2016. The entire contents of both of which are incorporated herein by reference.

TECHNICAL FIELD

The present invention relates to a method for manufacturing an electrode tab having a difference of thickness and a rechargeable battery including the same.

BACKGROUND ART

A rechargeable battery can be charged and discharged differing from a primary battery that is incapable of being recharged. The rechargeable battery is used to portable small electronic devices such as mobile phones, laptops, or camcorders or it is generally used to motor driving power sources of hybrid vehicles.

The rechargeable battery includes an electrode assembly including a positive electrode, a negative electrode, and a separator provided therebetween. The electrode assembly is received into a case to perform charging and discharging, and the case is made of a metal plate or a pouch and receives the electrode assembly.

When the case is made of a pouch, the electrode tab is connected to the electrode assembly from the inside of the pouch case, and part of it protrudes outside the pouch case. The electrode tab is formed to be thicker than the respective thicknesses of the positive electrode, the negative electrode, and the separator inside the pouch case. Accordingly, a thickness of a portion in which the electrode tab is connected to the electrode assembly is greater than thicknesses of other portions.

Therefore, a current is concentrated on the portion where the electrode tab and the electrode assembly are electrically connected, so there may be a danger of explosion, and when it becomes thick because of the connection of the electrode tab, a number of spirally winding of the electrode assembly is limited, so there is a limit in improving capacity of the battery. Accordingly, methods for connecting the electrode tabs with different thicknesses to the electrode assembly are proposed, but it is not easy to manufacture the electrode tabs with different thicknesses, so there are problems in producing the electrode tabs.

DISCLOSURE

Technical Problem

The present invention has been made in an effort to provide a method for easily producing an electrode tab with a thickness difference.

Technical Solution

The present invention has been made in another effort to provide a rechargeable battery for reducing a risk of explosion by use of the electrode tab and improving capacity of the battery.

An exemplary embodiment of the present invention provides a method for producing an electrode tab including: a step of preparing a thin plate of a strip shape having a first thickness; a step of forming an adhesion part by compressing the thin plate from one end thereof to a second thickness; and a step of releasing a compression applied to the adhesion part, and forming a lead tab part with the first thickness from the adhesion part to the other end of the thin plate.

The method may further include a step of inserting the thin plate into an adhesion roll in a length direction.

The method may further include a step of inserting the thin plate into an adhesion roll in a width direction.

The first thickness may be formed in a range of 50 μm to 100 μm.

The second thickness may be formed in a range of 1/1.1 to ¹/₁₀ of the thickness of the first thickness.

The method may further include: a step of inserting the thin plate into a press; a step of safely providing the thin plate to the press die; and a step of pressurizing with the press punch.

The method may further include a step of allowing the punch to pressurize the thin plate with the punch in a range of 1 to 10 times.

A length of the adhesion part may be formed to be in a range of ½ to 5 times the length of the lead tab part.

A first embodiment of the present invention provides a rechargeable battery including: an electrode assembly for charging and discharging a current; a pouch case for receiving the electrode assembly; and an electrode tab electrically connected to the electrode assembly and protruding outside the pouch case, wherein the electrode tab may include an adhesion part connected to the electrode assembly, and a lead tab part protruding outside the pouch case, allowing a protection tape to be wound on a portion contacting the pouch case, and being thicker than the adhesion part, and the adhesion part and the lead tab part may be integrally formed.

A curved part may be formed between the adhesion part and the lead tab part.

The adhesion part may be formed by inserting a strip-shaped thin plate into an adhesion roll and compressing the thin plate from one end thereof in a length direction.

The adhesion part may be formed by inserting a strip-shaped thin plate into an adhesion roll and compressing in a width direction of the thin plate.

The adhesion part may be formed by safely providing a strip-shaped thin plate to a press die and compressing with the press punch.

A thickness of the adhesion part may be formed to be in a range of 1/1.1 to ¹/₁₀ of the thickness of the lead tab part thickness.

A second embodiment of the present invention may provide a rechargeable battery including: an electrode assembly for charging and discharging a current; a case for receiving the electrode assembly; a cap assembly including a cap plate connected to seal and close an opening of the case, and an electrode end; and an electrode tab for electrically connecting the electrode assembly and the electrode end, wherein the electrode tab includes an adhesion part connected to the electrode assembly and a lead tab part connected to the electrode end and being thicker than the adhesion part, and the adhesion part and the lead tab part may be integrally formed.

A plurality of the electrode tabs may be formed.

A third exemplary embodiment of the present invention may provide a rechargeable battery including: an electrode assembly for charging and discharging a current; a case for receiving the electrode assembly; a cap assembly including a cap plate connected to seal and close an opening of the case, and an electrode end; a first electrode tab for connecting the electrode assembly and the case, and a second electrode tab for electrically connecting the electrode assembly and the electrode end, wherein electrode tab includes an adhesion part connected to the electrode assembly and a lead tab part connected to the electrode end or the case and being thicker than the adhesion part, and the adhesion part and the lead tab part may be integrally formed.

Advantageous Effects

The method for producing an electrode tab according to an exemplary embodiment of the present invention may further easily produce the electrode tab with a thickness difference thereby improving productivity.

Further, the rechargeable battery according to an exemplary embodiment of the present invention may reduce the risk of explosion by reducing the concentration of current at the portion where the electrode assembly and the electrode tab are connected, and may improve the capacity of the battery by increasing the number of spirally winding the electrode assembly.

MODE FOR INVENTION

Figure 1:
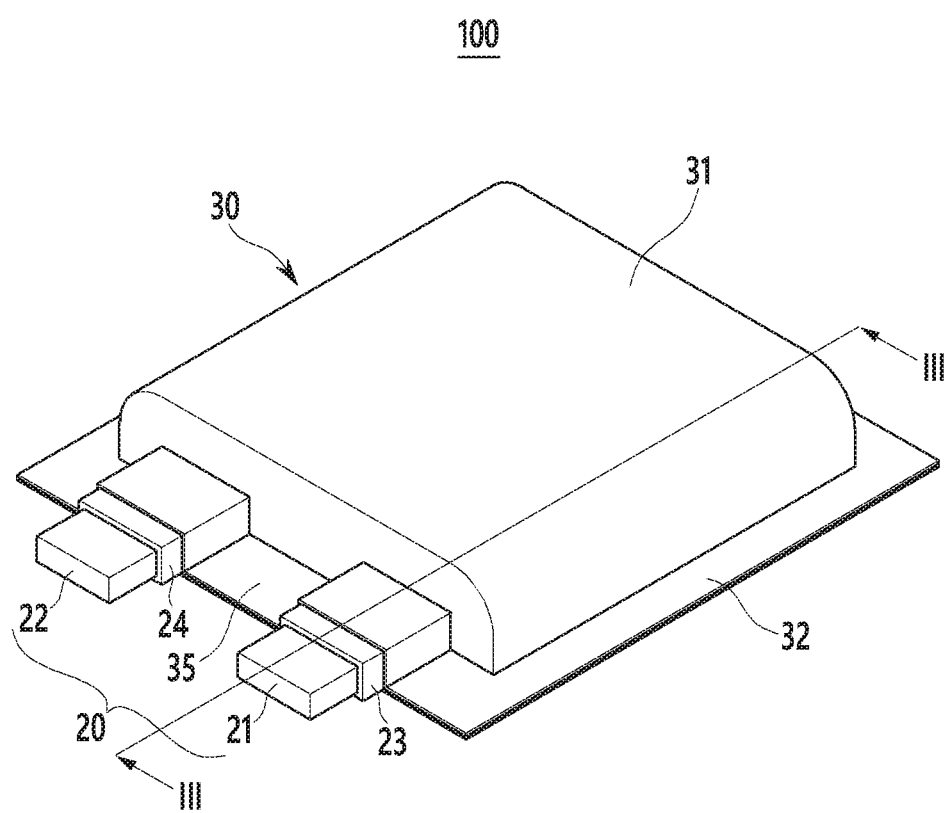
FIG. 1 shows a perspective view of a rechargeable battery according to a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "indirectly coupled" to the other element through a third element. Unless explicitly described to the contrary, the word "comprise" and variations such as "comprises" or "comprising" will be understood to imply the inclusion of stated elements but not the exclusion of any other elements.

When it is said that any part, such as a layer, film, region, or plate, is positioned on another part, it means the part is directly on the other part or above the other part with at least one intermediate part. An upper part of a target portion indicates an upper part or a lower part of the target portion, and it does not mean that the target portion is always positioned at the upper side based on a gravitational direction.

Figure 2:
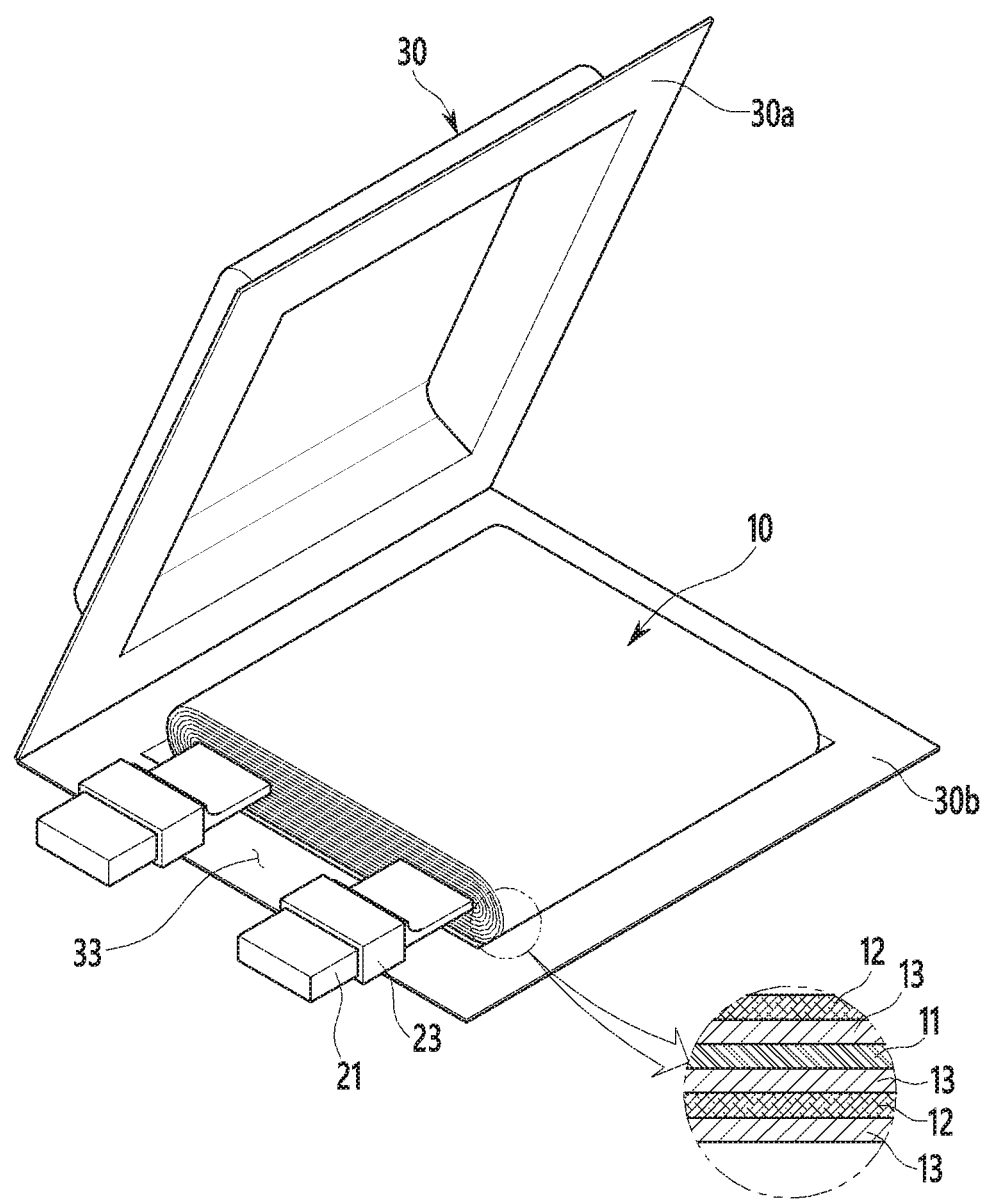
FIG. 2 shows an exploded perspective view of a rechargeable battery shown in FIG. 1.

FIG. 1 shows a perspective view of a rechargeable battery according to a first exemplary embodiment of the present invention and FIG. 2 shows an exploded perspective view of a rechargeable battery shown in FIG. 1.

Referring to FIG. 1 and FIG. 2, the rechargeable battery 100 includes an electrode assembly 10 for charging and discharging a current and a pouch case 30 for receiving the electrode assembly 10.

The electrode assembly 10 includes a separator 13 provided between a first electrode 11 and a second electrode 12.

The electrode assembly 10 may be formed by spirally winding the first electrode 11, the second electrode 12, and the separator 13. For another example, the electrode assembly 10 may be formed by stacking the first electrode 11, the second electrode 12, and the separator 13.

The first electrode 11 may exemplarily be a positive electrode. It may include a positive current collector made of a strip-shaped metal thin plate and a coating part 11a coated on one side or respective sides of the positive current collector. The positive current collector may be made of a metal material with excellent conductivity, for example, an aluminum thin plate. The coating part 11a may be made of a mixed material of a lithium-based oxide and a binder or a conductive material.

The second electrode 12 has an opposite polarity of the first electrode, and for example, it may be a negative electrode. It may include a negative current collector made of a strip-shaped metal thin plate and a coating part 12a coated on one side or respective sides of the negative current collector. The negative current collector may be made of a metal material with excellent conductivity, for example, a copper thin plate. The coating part 12a may be made of a mixed material of a negative active material such as a carbon material and a binder or a conductive material.

The separator 13 is made of a porous material, and it may be made of polyolefine such as polyethylene or polypropylene.

The pouch case 30 may include a receiver 31 for receiving the electrode assembly 10, and an edge bonded part 33 and an upper bonded part 35 formed around the receiver 31.

The receiver 31 of the pouch case 30 receives an electrolyte together with the electrode assembly 10. The pouch case 30 may be formed with a film including an insulating layer, and it may be made of a first plate 30a and a second plate 30b.

The first plate 30a and the second plate 30b of the pouch case 30 may be bonded by a thermal fusion on the edge bonded part 33 and the upper bonded part 36. Therefore, the electrolyte installed in the receiver 31 is prevented from leaking to the outside.

The electrode tab 20 may be divided into a first electrode tab 21 and a second electrode tab 22. The first electrode tab 21 and the second electrode tab 22 are electrically connected to the first electrode 11 and the second electrode 12. The first electrode tab 21 and the second electrode tab 22 may protrude outside the pouch case 30.

Protection tapes 23 and 24 may be wound on the first electrode tab 21 and the second electrode tab 22 to prevent a short-circuit from the upper bonded part 35. Accordingly, the upper bonded part 35 may be prevented from being thermally damaged, and the pouch case 30 may be prevented from being short-circuited by the current.

The electrode tab 20 is connected to uncoated regions 11b and 12b of the first electrode 11 on which no active material is coated or the second electrode 12. For example, the first electrode 11 includes a coating part 11a in which an active material is coated on the current collector and an uncoated region 11b in which the active material is not coated, and the first electrode tab 21 may be connected to the uncoated region 11b through a welding.

The electrode tab 20 protrudes outside the pouch case 30. The electrode tab 20 includes a step in a terrace space 33 formed inside the pouch case 30 because of a thickness difference. For example, regarding the first electrode tab 21, a thickness of a portion protruding outside the pouch case 30 is formed to be less than a thickness of a portion connected to the electrode assembly 10. The first electrode tab 21 is integrally formed, and a step is formed in the terrace space 33 because of the thickness difference.

By this, the phenomenon that the current concentrates on the portion where the electrode tab 20 is electrically connected to the electrode assembly 10 is reduced to thus decrease the risk of explosion. Further, the connection portion of the uncoated regions 11b and 12b to which the electrode tab 20 is connected to are formed to be thin, so the number of spirally winding the electrode assembly 10 received in the receiver 31 may be increased thereby improving the capacity of the battery.

The electrode tab 20 may be formed of the same material as the current collector of the first electrode 11 or the second electrode 12. For example, the first electrode 11 may be a positive electrode, and the current collector of the first electrode 11 may be an aluminum thin plate. Accordingly, the first electrode tab 21 may be made of aluminum. Further, the second electrode 12 may be a negative electrode, and the current collector of the second electrode 12 may be made of a copper thin plate. Therefore, the second electrode tab 22 may be made of copper.

Figure 3:
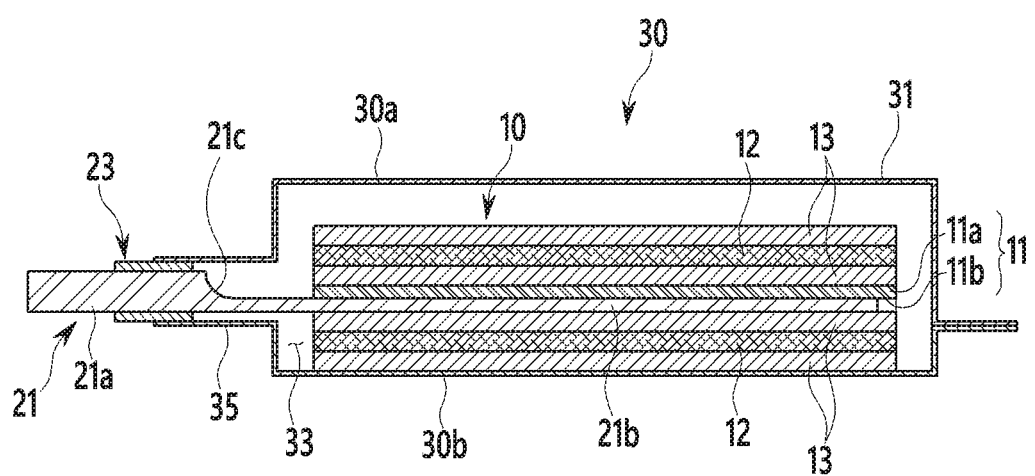
FIG. 3 shows a cross-sectional view of an electrode assembly of FIG. 1 with respect to a line III-III.

FIG. 3 shows a cross-sectional view of an electrode assembly of FIG. 1 with respect to a line III-III.

Referring to FIG. 3, the first electrode tab 21 is connected to the uncoated region 11b of the first electrode 11.

The electrode tab 20 includes a lead tab part 20a and an adhesion part 20b, the lead tab part 20a and the adhesion part 20b are integrally formed, and the lead tab part 20a is different from the adhesion part 20b in thickness. A curved part 20c may be formed between the lead tab part 20a and the adhesion part 20b.

The first electrode tab 21 will now be exemplified.

The adhesion part 21b of the first electrode tab 21 may be connected to the uncoated region 11b of the first electrode 11. A connecting length of the adhesion part 21b in the uncoated region 11b may be formed to be less than a length of the electrode assembly 10. The adhesion part 21b may be connected to the uncoated region 11b of the first electrode 11 through a welding.

The adhesion part 21b may be formed to have a thickness that is equal to or less than the coating part 11a on one side of the first electrode 11. Accordingly, when the first electrode tab 21 is connected to the uncoated region 11b, the thickness of the first electrode 11 does not increase.

The lead tab part 21a extends from the adhesion part 21b and protrudes outside the pouch case 30, and protection tapes 23 and 24 are wound on the side contacting the pouch case 30.

The lead tab part 21a is formed to be thicker than the adhesion part 21b. The lead tab part 21a may have a step from the adhesion part 21b in the terrace space 33 formed inside the pouch case 30, and it may extend outside the pouch case 30. A curved part 21c may be formed between the lead tab part 21a and the adhesion part 21b.

Figure 4:
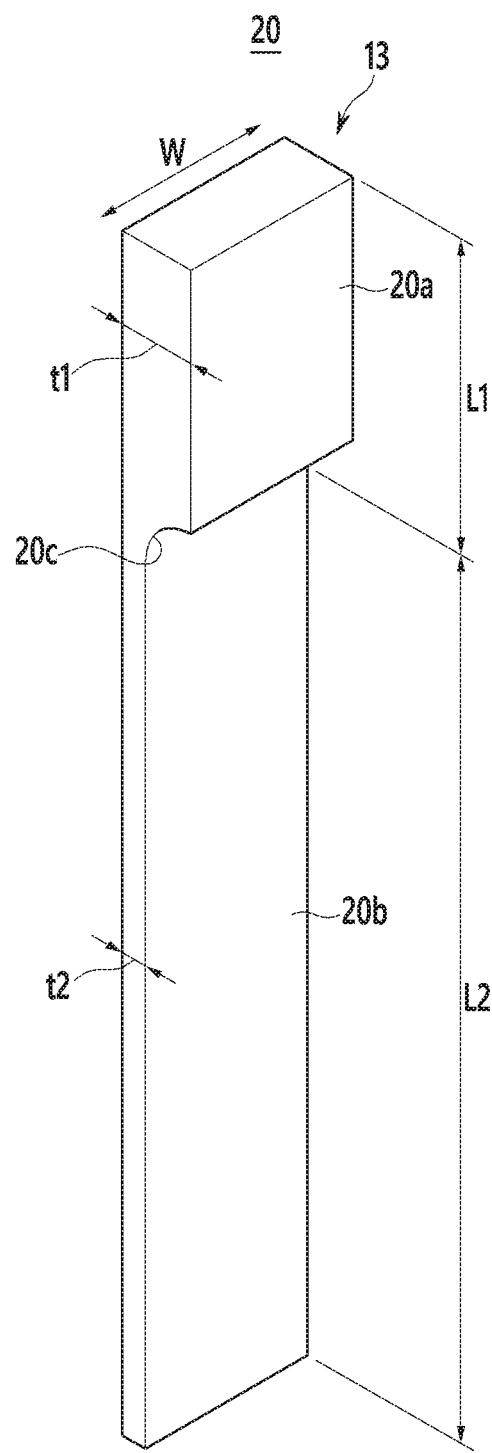
FIG. 4 shows a perspective view of an electrode tab applied to an electrode assembly of FIG. 2.

FIG. 4 shows a perspective view of an electrode tab applied to an electrode assembly of FIG. 2.

Referring to FIG. 4, the electrode tab 20 includes a lead tab part 20a and an adhesion part 20b, and a first thickness t1 of the lead tab part 20a may be greater than a second thickness t2 of the adhesion part 20b. A length L2 of the adhesion part 20b may be formed to be greater than a length L1 of the lead tab part 20a.

The lead tab part 20a and the adhesion part 20b of the electrode tab 20 may be formed to have a same width (W). Not limited to this, the width of the lead tab part 20a may be different from the width of the adhesion part 20b.

The second thickness t2 of the adhesion part 20b may be formed to be in the range of 1/1.1 to 1/10 times the first thickness t1 of the lead tab part 20a. For example, the first thickness t1 of the lead tab part 20a may be formed to be equal to the thickness of the thin plate 50, and the first thickness t1 may be formed to be in the range of 50 μm to 100 μm. The lead tab part 20a has the same thickness as the strip-shaped thin plate 50. That is, to further easily manufacture the electrode tab 20, the thickness of the strip-shaped thin plate 50 is selected to be the first thickness t1 in advance consideration of the thickness of the lead tab part 20a to be protruded outside the rechargeable battery 100.

Accordingly, the second thickness t2 of the adhesion part 20b may be formed in the range of 45 μm to 90 μm or 5 μm to 10 μm. The length L2 of the adhesion part 20b may be formed to be in the range of ½ to 5 times the length L1 of the lead tab part 20a. When the length L2 of the adhesion part 20b is formed to be great, adherence with the uncoated regions 11b and 12b may be improved. Further, when the current flows to the electrode assembly 10 according to a charging and discharging, the concentration of temperature may be dispersed.

A curved part 20c that is formed in a curved way may be formed between the lead tab part 20a and the adhesion part 20b. The curved part 20c may be differently formed depending on the method for manufacturing an electrode tab 20.

Figure 5:
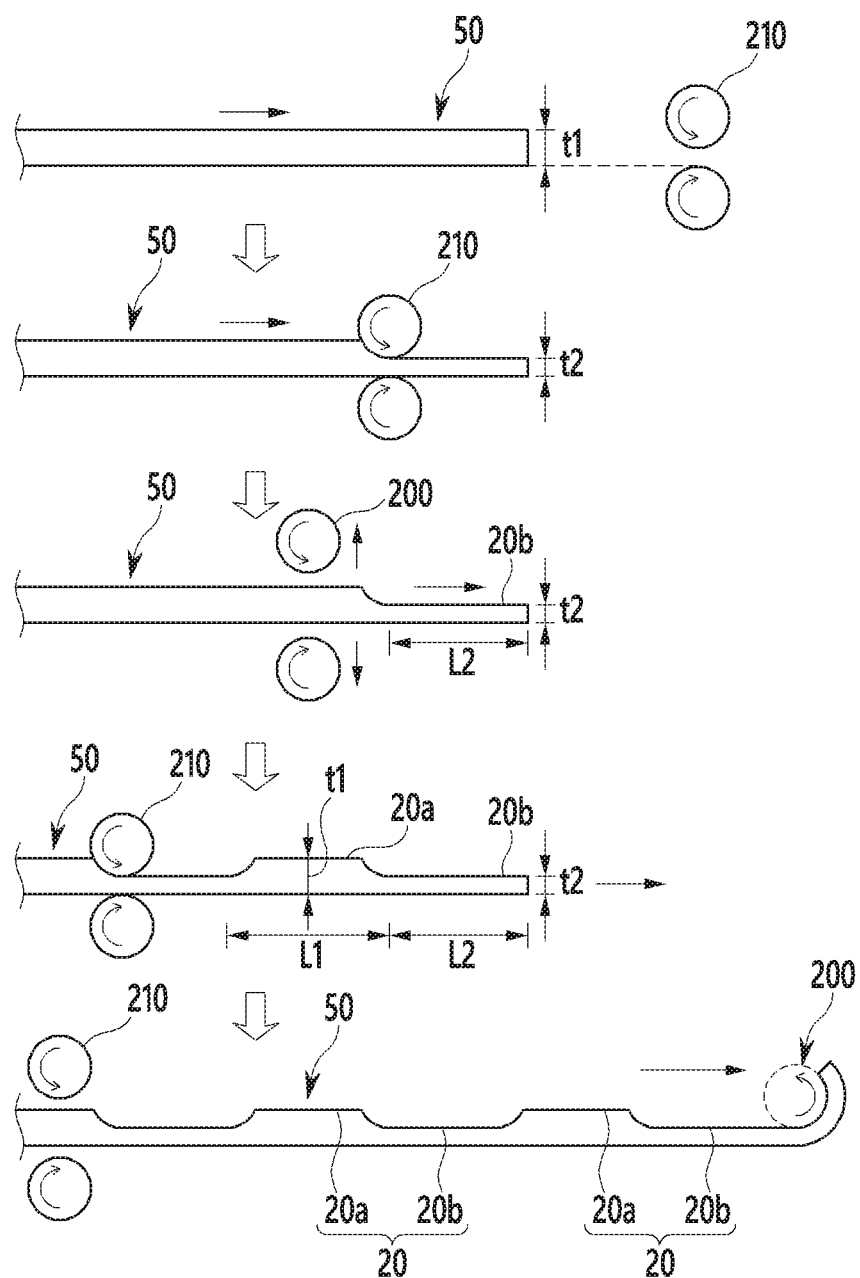
FIG. 5 shows a method for producing an electrode tab applied to an electrode assembly of FIG. 2 according to a first exemplary embodiment.

FIG. 5 shows a method for producing an electrode tab applied to an electrode assembly of FIG. 2 according to a first exemplary embodiment.

Referring to FIG. 5, the electrode tab 20 may be manufactured by inserting the strip-shaped thin plate 50 with the first thickness t1 into an adhesion roll 210.

First, the method for manufacturing an electrode tab 20 includes a step of preparing a strip-shaped thin plate 50 with a first thickness t1. The thin plate 50 may, as described above, be an aluminum thin plate or a copper thin plate according to the current collector of the first electrode 11 and the current collector of the second electrode 12. The thin plate 50 has a strip shape, it is continuously inserted into the adhesion roll 210, an adhesion part 20b and a lead tab part 20a are formed through a repeated process for compressing and releasing the adhesion roll 210, and they may be wrapped on the reel tray 200 and may then be packed.

Next, the method includes a step of compressing the thin plate 50 from one end with a second thickness t2 to form an adhesion part 20*b*. For example, the strip-shaped thin plate 50 with the first thickness t1 moves in a length direction and is inserted into the adhesion roll 210. The movement may use a moving means such as a conveyor belt, and here, the moving means will be omitted.

The adhesion roll 210 may be dispose from top to bottom, and the lower side of the thin plate 50 and the adhesion roll 210 provided at the bottom may have the same level. When the thin plate 50 is inserted into the adhesion roll 210 in the length direction, one side of the thin plate 50 may be compressed from one end of the thin plate 50. For example, when the levels of the adhesion roll 210 provided at the bottom and the lower side of the thin plate 50 are matched and are inserted into the adhesion roll 210, the adhesion roll 210 provided at the top may compress the upper side of the thin plate 50 to form an adhesion part 20*b* with a second thickness t2. The second thickness t2 of the adhesion part 20*b* may be formed to be in the range of 1/1.1 to 1/10 of the first thickness t1 of the thin plate 50.

Next, a lead tab part 21*a* that is formed to the other end of the thin plate 50 from the adhesion part 20*b* with the first thickness t1 and is thicker than the adhesion part 20*b* by releasing the compression applied to the adhesion part 20*b* formed on the thin plate 50 may be included. That is, the compression of the thin plate 50 is released by moving the adhesion roll 210 up and down and accordingly forming a greater space between the adhesion roll 210. A curved part 20*c* may be formed at a compression released point by the movement of the adhesion roll 210. The thin plate 50 moving while the compression is released becomes a lead tab part 20*a*. Accordingly, the thickness of the lead tab part 20*a* is formed to be the first thickness t1 of the thin plate 50. As a result, the lead tab part 20*a* is formed to be thicker than the adhesion part 20*b*.

A plurality of electrode tabs 20 connected to each other may be formed by continuously supplying a strip-shaped thin plate 50 to the adhesion roll 210 and repeating the process of compressing the thin plate 50 and releasing the compression thereof. The thin plate 50 on which the electrode tabs 20 are formed may be wound and wrapped by a reel tray 200.

Figure 6:
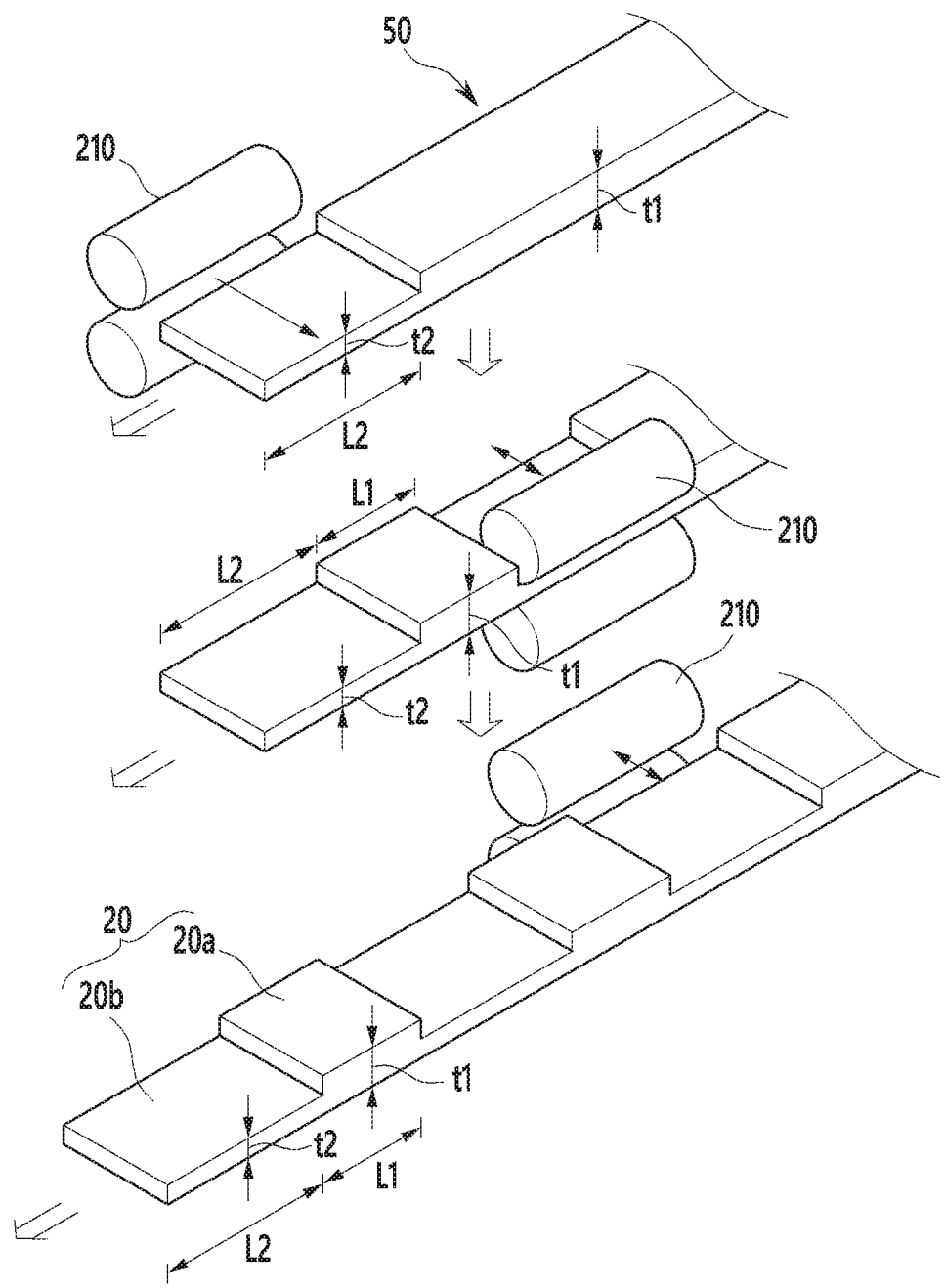
FIG. 6 shows a method for producing an electrode tab applied to an electrode assembly of FIG. 2 according to a second exemplary embodiment.

FIG. 6 shows a method for producing an electrode tab applied to an electrode assembly of FIG. 2 according to a second exemplary embodiment.

Referring to FIG. 6, the adhesion roll 210 may be compressed in a width (W) direction of the strip-shaped thin plate 50. Common descriptions to the electrode tab 20 according to a first exemplary embodiment will be omitted, and differences will be described.

A length of the adhesion roll 210 may be formed to be equal to a length L2 of the adhesion part 20*b* to be formed on the thin plate 50 by a compression. According to this, the adhesion part 20*b* may be easily formed by vertically compressing the thin plate 50 moving in one direction by the moving means.

In this case, the adhesion roll 210 may be generally formed to be cylindrical, so a vertical side is formed between the adhesion part 20*b* and the lead tab part 20*a*. Therefore, a plurality of electrode tabs 20 formed by the continuous provision of the thin plate 50 may be easily incised.

Figure 7:
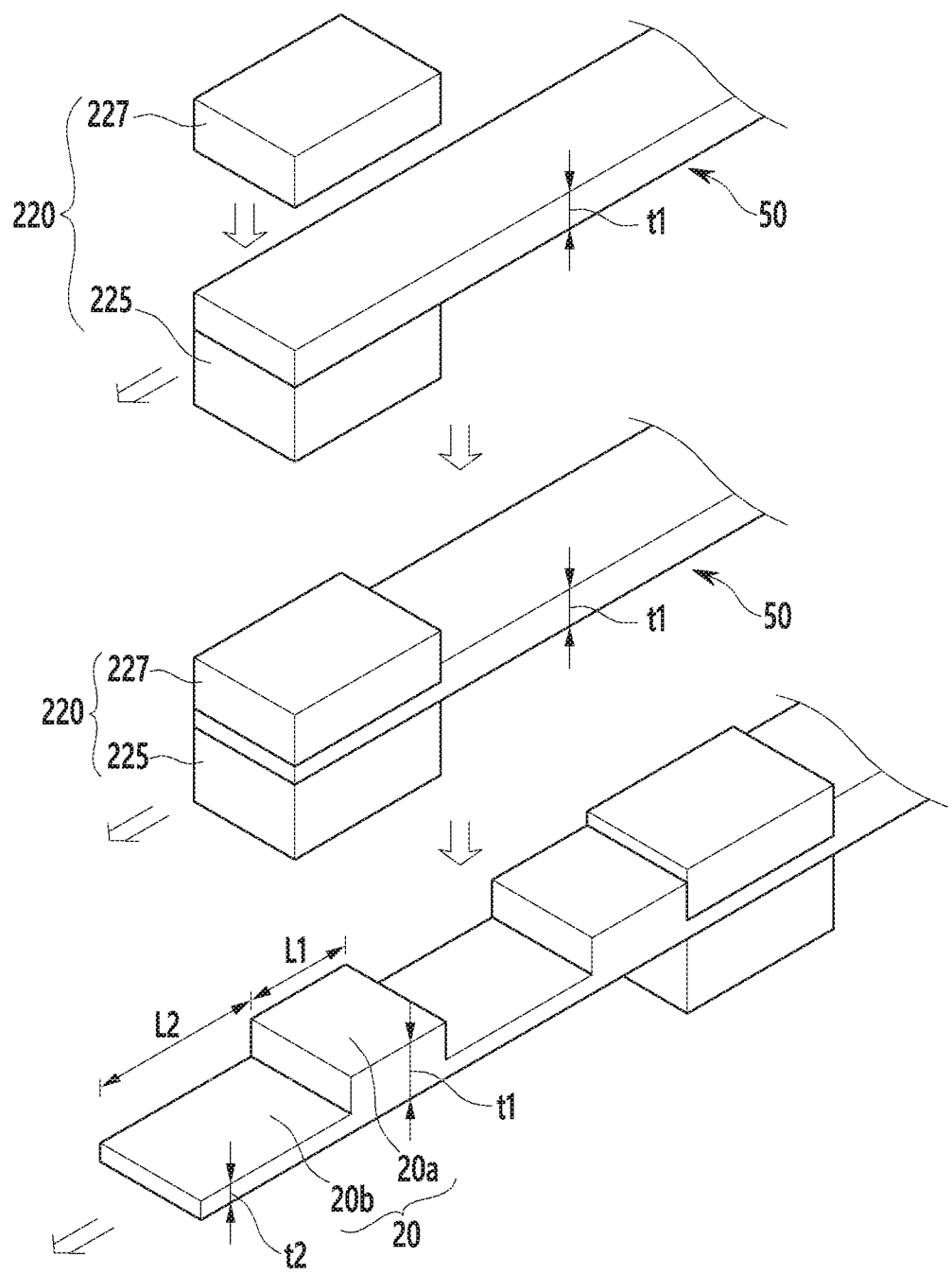
FIG. 7 shows a method for producing an electrode tab applied to an electrode assembly of FIG. 2 according to a third exemplary embodiment.

FIG. 7 shows a method for producing an electrode tab applied to an electrode assembly of FIG. 2 according to a third exemplary embodiment.

Referring to FIG. 7, the continuously supplied strip-shaped thin plate 50 may be pressurized by the press 220 to form an adhesion part 20*b*.

Common descriptions to the above-described electrode tab 20 according to first and second exemplary embodiments will be omitted, and differences will be described.

The strip-shaped thin plate 50 is moved in the length direction and is inserted into the press 220. The movement may use a moving means such as a conveyor belt, and here, the moving means will be omitted.

For example, a die 225 may be disposed at the bottom of the press 220, and a punch 227 may be disposed at the top. The thin plate 50 moved by the moving means is provided to the die 225. Next, the thin plate 50 may be pressurized by the punch 227. For example, the punch 227 may pressurize the thin plate 50 twice to ten times to form an adhesion part 20*b*. In this instance, the thin plate 50 may stop moving until the pressurization by the punch finishes. The second thickness t2 of the adhesion part 20*b* may be formed to be in the range of 1/1.1 to 1/10 the first thickness t1 of the thin plate 50. The press 220 may be easier in controlling the second thickness t2 of the adhesion part 20*b* than another exemplary embodiment. The second thickness t2 that is a thickness of the adhesion part 20*b* consecutively and alternately disposed on the thin plate 50 may be differently formed by using the press 220.

Figure 8:
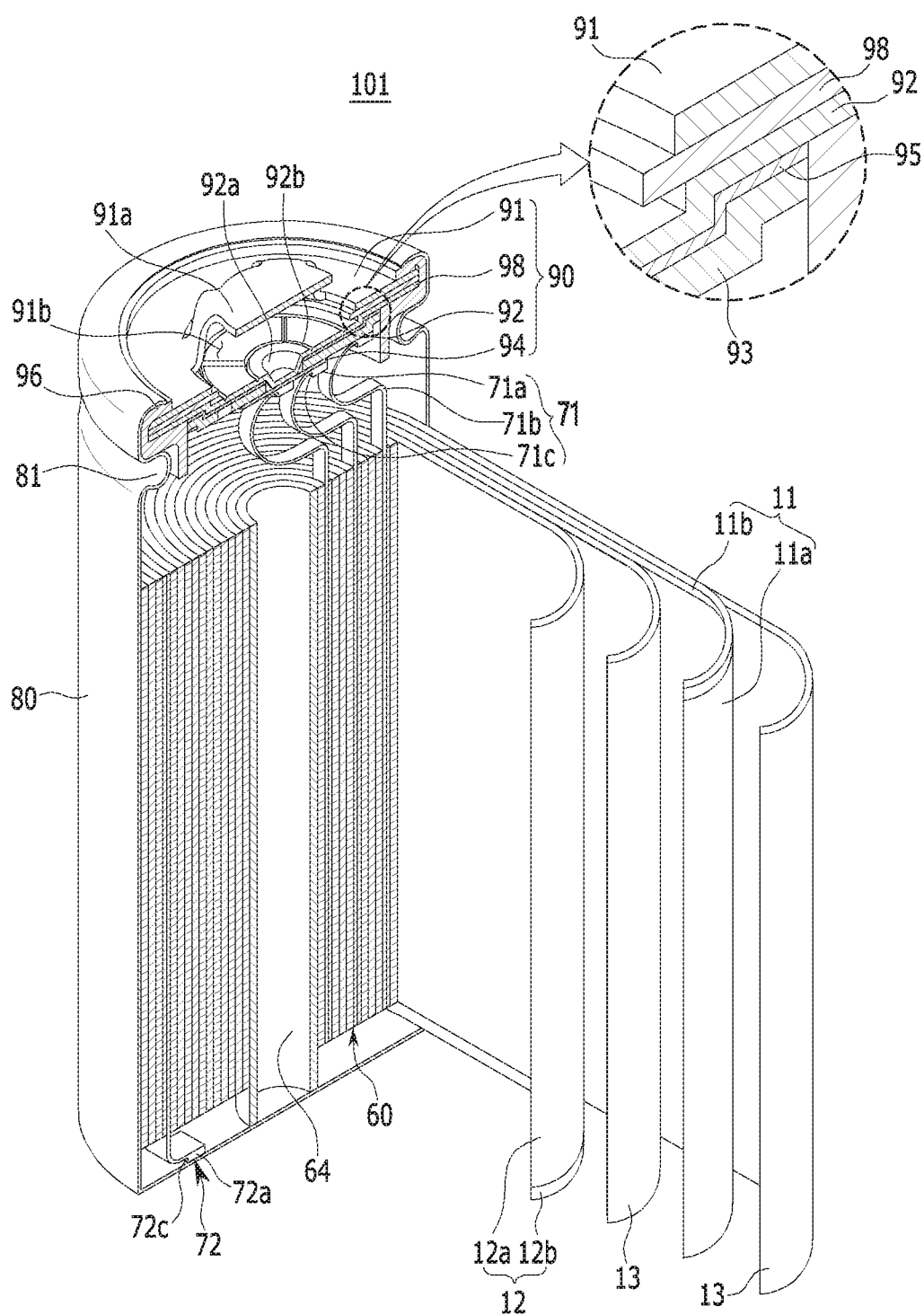
FIG. 8 shows an exploded perspective view of a rechargeable battery according to a second exemplary embodiment of the present invention.
Figure 9:
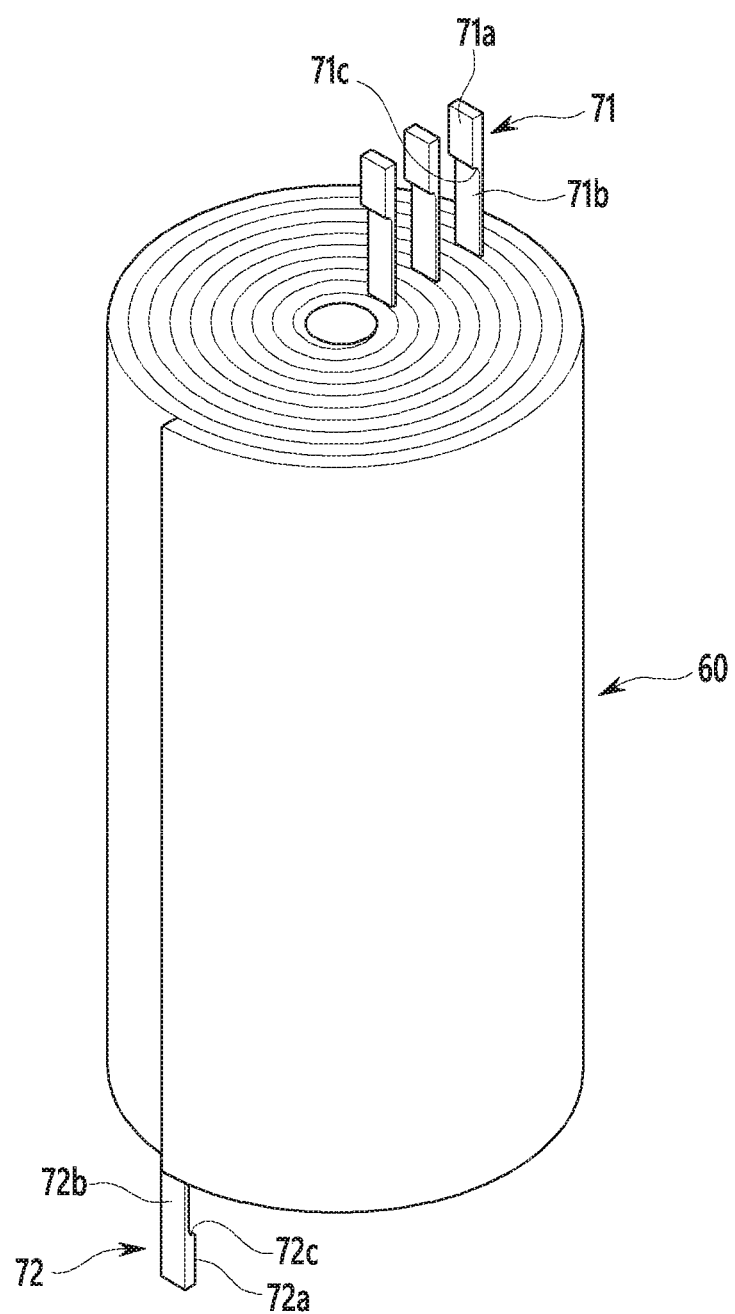
FIG. 9 shows a perspective view of an electrode assembly applied to FIG. 8.

FIG. 8 shows an exploded perspective view of a rechargeable battery according to a second exemplary embodiment of the present invention and FIG. 9 shows a perspective view of an electrode assembly applied to FIG. 8.

Referring to FIG. 8 and FIG. 9, the rechargeable battery 101 according to a second exemplary embodiment includes an electrode assembly 60 for generating a current, a case 80 for receiving the electrode assembly 60, and a cap assembly 90 combined to the case 80 and electrically connected to the electrode assembly 60.

The electrode assembly 60 includes a first electrode 11, a separator 13, and a second electrode 12 that are sequentially disposed. The electrode assembly 60 is formed by spirally winding a first electrode 11, a second electrode 12, and a separator 13 that is an insulator disposed therebetween. For example, the electrode assembly 60 is formed to be cylindrical. A core pin 64 is disposed in a center of the cylindrical electrode assembly 60. The core pin 64 is formed to be cylindrical, and it supports the electrode assembly 60 so as to maintain the cylindrical shape of the electrode assembly 60.

The first electrode 11 and the second electrode 12 include coating parts 11*a* and 12*a* on which an active material is coated and uncoated regions 11*b* and 12*b* in which the active material is not coated.

A first electrode tab 71 is connected to the uncoated region 11*b* of the first electrode 11, a second electrode tab 72 is connected to the uncoated region 12*b* of the second electrode 12, and a second electrode tab 72 is disposed at the bottom of the electrode assembly 60 and is attached to the bottom of the case 80 through a welding. A plurality of first electrode tabs 71 may be formed.

The electrode tab 70 may be divided into the first electrode tab 71 and the second electrode tab 72. The first electrode tab 71 and the second electrode tab 72 are electrically connected to the first electrode 11 and the second electrode 12 respectively. The electrode tab 70 includes a lead tab part 70*a* and an adhesion part 70*b*, the lead tab part 70*a* and the adhesion part 70*b* are integrally formed, and the lead tab part 70*a* is different from the adhesion part 70*b* in thickness. A curved part 70*c* may be formed between the lead tab part 70*a* and the adhesion part 70*b*.

Through this, the phenomenon that the current concentrates on the portion where the electrode tab 70 is electrically connected to the electrode assembly 60 is reduced to decrease the risk of explosion. Further, a connection portion of the uncoated regions 11b and 12b to which the electrode tab 70 is connected, is formed to be thin, so the number of spirally winding the electrode assembly 60 received in the case 80 may be increased and the capacity of the battery may be improved.

According to the present exemplary embodiment, the configuration in which the first electrode tab 71 is installed at the top and the second electrode tab 72 is installed at the bottom is described, but the present invention is not limited thereto, and the first electrode tab 71 may be installed at the bottom and the second electrode tab 72 may be installed at the top.

The case 80 may be formed to be a cylinder or a square of which one side is opened so that the electrode assembly 60 may be inserted.

The case 80 is connected to the second electrode tab 72 and it works as a second electrode end in the rechargeable battery 101, and it is formed of a conductive metal such as aluminum, an aluminum alloy, or a nickel plated steel.

The cap assembly 90 is inserted into the case 80 and is then fixed to the case 80 by a clamping process, and in this instance, a bidding part 81 and a clamping part 82 are formed in the case 80.

The cap assembly 90 includes a gasket 96 and is combined to the opened side of the case 80 to thus close and seal the case 80 for storing the electrode assembly 60 and the electrolyte solution. The cap assembly 90 includes a cap plate 91, a vent plate 92, a middle plate 93, a sub plate 94, and a positive temperature coefficient element (PCT) 98.

The cap plate 91 may be formed to have a plate shape on which an outer terminal 91a protruding upward and an exhaust hole 91b are formed. The cap plate 91 is finally electrically connected to the first electrode tab 71, and functions as a first electrode end in the rechargeable battery 101.

The positive temperature coefficient element 98 is disposed between the cap plate 91 and the vent plate 92. The positive temperature coefficient element 98 is formed to be a circular ring, and is provided between the cap plate 91 and the vent plate 92. The positive temperature coefficient element 98 is an element of which resistance increases as a temperature rises, and it controls a current flow between the cap plate 91 and the vent plate 92. In a predetermined temperature exceeding state, the positive temperature coefficient element 98 has electrical resistance increasing to infinity, thereby blocking the flow of the charged or discharged current.

The vent plate 92 is disposed below the cap plate 91, and it functions to interrupt the electrical connection of the electrode assembly 60 and the cap plate 91 in a predetermined pressure condition. Further, the vent plate 92 is fractured in the predetermined pressure condition to discharge gas provided inside the rechargeable battery 101.

For this, the vent plate 92 includes a groove protruding toward the bottom, an access protrusion 92a protruding toward the sub plate 94 from a center of the groove, and a notch 92b formed around the access protrusion 92a.

The notch 92b may be formed in various forms so that it may be fractured when the internal pressure of the rechargeable battery 101 increases.

The vent plate 92 and the sub plate 94 forms a current interrupt device (CID) for interrupting the current when the internal pressure of the rechargeable battery increases. A connector of the current interrupt device (CID) is formed by a welding portion of the access protrusion 92a and the sub plate 94. When the current interrupt device (CID) operates, the access protrusion 92a rises upward and the access protrusion 92a is separated from the sub plate 94, and the electrode assembly 60 is accordingly electrically separated from the cap plate 91.

Further, when the internal pressure of the rechargeable battery 101 increases after the access protrusion 92a rises upward, the notch 92b is fractured and the gas generated inside the rechargeable battery 101 is discharged to the outside through the exhaust hole 91b.

The sub plate 94 is formed to have a circular plate shape, and it faces the vent plate 92 and is electrically connected to the access protrusion 92a. The sub plate 94 is bonded to the middle plate 93 through a welding and is electrically connected to the electrode assembly 60 with the middle plate 93 as a medium. However, the middle plate 93 is electrically connected to the vent plate 92 only through the sub plate 94, and the current interrupt device may be operable when the sub plate 94 does not directly contact the vent plate 92.

The middle plate 93 is disposed between the vent plate 92 and the sub plate 94. A through-hole may be formed in the center of the middle plate 93 so that the access protrusion 92a may be inserted, and a plurality of ventilation holes may be formed outside the through-hole so as to transmit the internal pressure of the rechargeable battery 101 to the vent plate 92.

The middle plate 93 is electrically connected to the first electrode tab 71. For example, a plurality of first electrode tabs 71 may be formed. The lead tab part 71a of the first electrode tab 71 is fixed to the middle plate 93 through a welding and is electrically connected to the same.

Accordingly, the middle plate 93 is electrically connected to the vent plate 92 through the sub plate 94 and the access protrusion 92a on one side. The same is connected to the first electrode tab 71 on the other side. As a result, the first electrode tab 71 is electrically connected to the cap plate 91 through the middle plate 93, the sub plate 94, and the vent plate 92.

In addition, an insulating member 95 for insulating the middle plate 93 and the vent plate 92 is installed between the middle plate 93 and the vent plate 92.

While this invention has been described in connection with what is presently considered to be practical exemplary embodiments, it is to be understood that the invention is not limited to the disclosed embodiments, but, on the contrary, is intended to cover various modifications and equivalent arrangements included within the scope of the appended claims.

<Description of symbols>

| | |
|---|---|
| 100: rechargeable battery | 200: reel tray |
| 210: adhesion roll | 220: press |
| 225: die | 227: punch |
| 10: electrode assembly | 11: first electrode |
| 12: second electrode | 13: separator |
| 11a, 12a: coating part | 11b, 12b: uncoated region |
| 20: electrode tab | 20c, 21c: curved part |
| 21: first electrode tab | 22: second electrode tab |
| 20a, 21a, 22a: lead tab part | 20b, 21b, 22b: adhesion part |
| 23, 24: protection tape | 30: pouch case |
| 30a: first plate | 30b: second plate |
| 31: receiver | 32: edge bonded part |
| 33: terrace space | 35: upper bonded part |
| 50: thin plate | |
| 101: rechargeable battery | 60: electrode assembly |
| 70: electrode tab | 71: first electrode tab |
| 72: second electrode tab | 70a, 71a, 72a: lead tab part |
| 70b, 71b, 72b: adhesion part | 70c, 71c, 72c: curved part |

<Description of symbols>

| | |
|---|---|
| 80: case | 81: bidding part |
| 82: clamping part | 90: cap assembly |
| 91: cap plate | 91a: outer terminal |
| 91b: exhaust hole | 92: vent plate |
| 92a: access protrusion | 92b: notch |
| 93: middle plate | 94: sub plate |
| 95: insulating member | 96: gasket |
| 98: positive temperature coefficient element | W: width |
| t1: first thickness | t2: second thickness |
| L1: lead tab part length | L2: adhesion part length |

The invention claimed is:

1. A rechargeable battery comprising:
an electrode assembly for charging and discharging a current;
a pouch case for receiving the electrode assembly; and
an electrode tab electrically connected to the electrode assembly and protruding outside the pouch case,
wherein the electrode tab includes
an adhesion part connected to the electrode assembly, and
a lead tab part protruding outside the pouch case, allowing a protection tape to be wound on a portion contacting the pouch case, and being thicker than the adhesion part, and
the adhesion part and the lead tab part are integrally formed from a same continuous material having a portion removed at the adhesion part to cause the lead tab to be thicker than the adhesion part.

2. The rechargeable battery of claim 1, wherein a curved part is formed between the adhesion part and the lead tab part.

3. The rechargeable battery of claim 1, wherein the adhesion part is formed by inserting a strip-shaped thin plate into an adhesion roll and compressing the thin plate from one end thereof in a length direction.

4. The rechargeable battery of claim 1, wherein the adhesion part is formed by inserting a strip-shaped thin plate into an adhesion roll and compressing in a width direction of the thin plate.

5. The rechargeable battery of claim 1, wherein the adhesion part is formed by safely providing a strip-shaped thin plate to a press die and compressing with the press punch.

6. The rechargeable battery of claim 1, wherein a thickness of the adhesion part is formed to be in a range of 1/1.1 to 1/10 of the thickness of the lead tab part thickness.

7. A rechargeable battery comprising:
an electrode assembly including a first electrode and a second electrode;
a case for receiving the electrode assembly;
a cap plate combined to the case;
a middle plate disposed below the cap plate; and
a first electrode tab for electrically connecting the first electrode and the middle plate,
wherein the first electrode tab includes
an adhesion part connected to the first electrode, and
a lead tab part connected to the middle plate and being thicker than the adhesion part,
a curved part is formed between the adhesion part and the lead tab part, and
the adhesion part and the lead tab part are integrally formed from a same continuous material having a portion removed at the adhesion part to cause the lead tab to be thicker than the adhesion part.

8. The rechargeable battery of claim 7, wherein a plurality of the electrode tabs are formed.

9. The rechargeable battery of claim 7, wherein a second electrode tab electrically connected to the second electrode is included, and
the second electrode tab is connected to the case at a bottom of the electrode assembly.

10. The rechargeable battery of claim 7, wherein a thickness of the adhesion part is formed to be in a range of 1/1.1 to 1/10 of the thickness of the lead tab part thickness.

* * * * *